May 15, 1956 E. E. MASTERSON 2,745,604

TAPE TENSION WINDING CONTROL

Filed May 11, 1951 3 Sheets-Sheet 1

INVENTOR
Earl E. Masterson
BY [signature]
ATTORNEY

TAPE TENSION WINDING CONTROL

Filed May 11, 1951 3 Sheets-Sheet 2

INVENTOR
Earl E. Masterson
BY Morris Rabkin
ATTORNEY

May 15, 1956 E. E. MASTERSON 2,745,604

TAPE TENSION WINDING CONTROL

Filed May 11, 1951 3 Sheets-Sheet 3

INVENTOR
Earl E. Masterson
BY Morris L. Rabkin
ATTORNEY

United States Patent Office 2,745,604

Patented May 15, 1956

2,745,604

TAPE TENSION WINDING CONTROL

Earl E. Masterson, Palmyra, N. J., assignor to Radio Corporation of America, a corporation of Delaware Application May 11, 1951, Serial No. 225,818

The terminal 15 years of the term of the patent to be granted has been disclaimed 1 Claim. (Cl. 242—55)

This invention relates to a tape reeling system, and more particularly to a system which is especially suited for use in magnetic recording apparatus.

It has previously been proposed to provide a reeling system wherein a flexible tape is driven from a storage reel to a take up reel by a constant speed capstan. The previous system also provides friction clutch means for driving the respective reels. In order to compensate for the variations in tension in the tape which would be caused by the changes in the diameter of the tape remaining on the reels, the clutches were so arranged that the frictional coupling of the clutch was variable in response to the changes in the weight of the tape remaining on either reel. Since the weight of the tape on a reel is proportional to the diameter of the tape thereon, a degree of compensation is effected. Such a system is more fully described in a copending application of the present inventor, Ser. No. 153,247, filed March 31, 1950, now abandoned.

It has become apparent that, in addition to the above compensation, means should be provided whereby any irregularities in the rotational movement of the reels is not transmitted to a portion of the tape where a smooth constant speed is desired, such as in the vicinity of the transducer in magnetic recording apparatus.

It is, therefore, an object of this invention to provide an improved tape reeling system in which irregularities in the motion of the tape reels are isolated from a desired constant speed portion of the moving tape.

It is another object of this invention to provide an improved reeling system of the type set forth wherein means are provided for controlling the drive of the tape reels in response to variations in the tension in the tape.

It has been found that, in the process of making disk phonograph records, it is more economical to record the sounds, first, on magnetic tape records. These records may be played back immediately for the approval of the producers and the recording artist. If the recording is approved, it may then be rerecorded onto a disk master. If objectionable passages in the recording are found, the record may be edited or it may be erased and recorded over again, and then played back for approval. When the original recording is made on disk records, and the recording is faulty, the record disk is discarded. Thus, by using tape for the original recording, time and material is saved in the process.

It is, therefore, a further object of the present invention to provide a magnetic recording apparatus which is particularly adapted for use as a rerecording and editing machine suitable for use in recording studios.

In accomplishing these and other objects, there has been provided, in accordance with the present invention, a tape reeling system wherein a flexible tape is adapted to be driven from a supply or storage reel to a take up reel. The two reels are driven through variable friction clutches. A plurality of tape guides define a path for the tape which includes one or more loops. At least one of the tape guides comprises a jockey idler which rides in the closed end of the loop in the tape. The jockey idler is mounted on a crank which is coupled to one of the variable friction clutches so as to vary the amount of frictional engagement of that clutch in response to variations in the length of the loop. The length of the loop varies in accordance with variations in the tension in the tape.

A better understanding of this invention may be had from the following detailed description when read in connection with the accompanying drawings in which.

Figure 1:
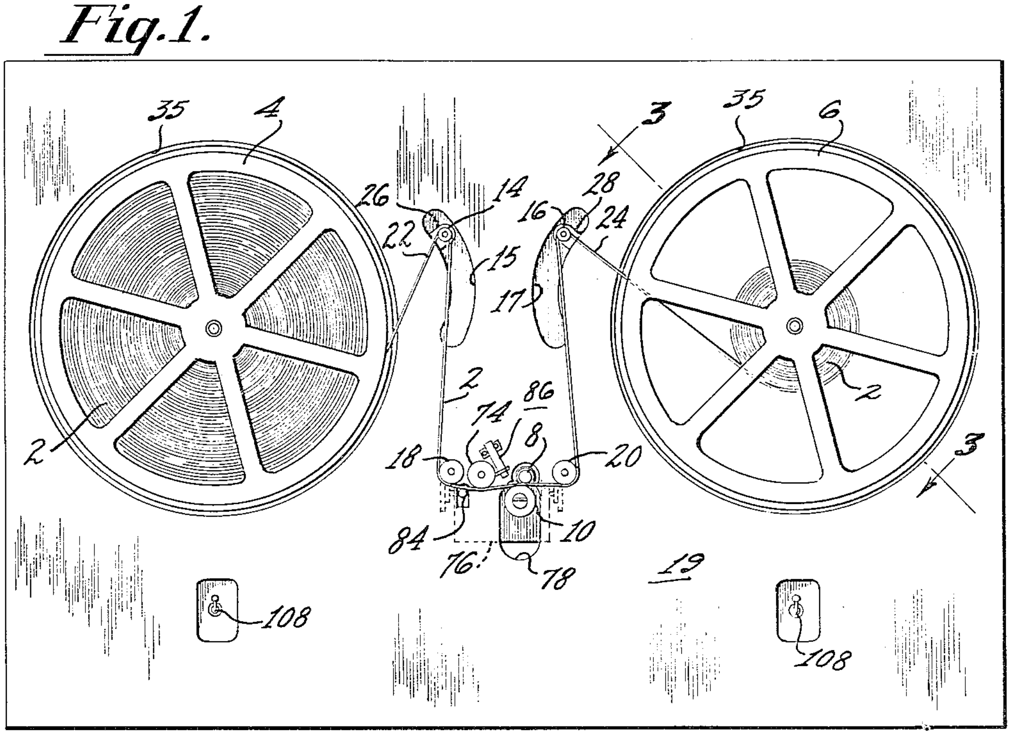
Figure 1 is a top view of a tape recording machine made in accordance with the present invention.
Figure 2:
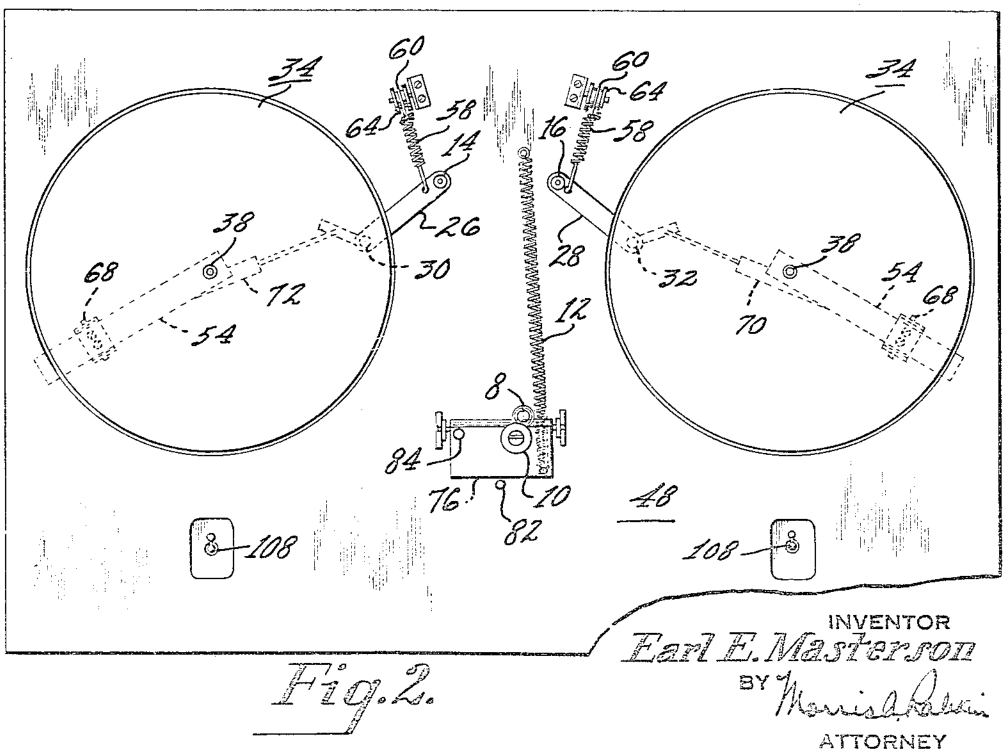
Figure 2 is a view similar to that shown in Figure 1, but having the top plate removed.
Figure 3:
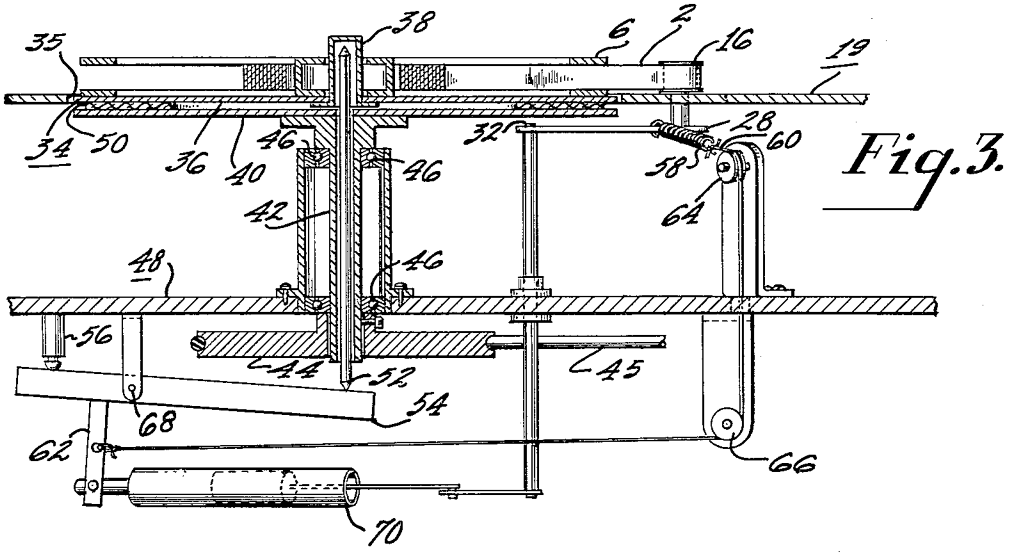
Figure 3 is a somewhat enlarged view, partly in section, taken along the line 3—3 of Figure 1, and looking in the direction of the appended arrows.
Figure 6:
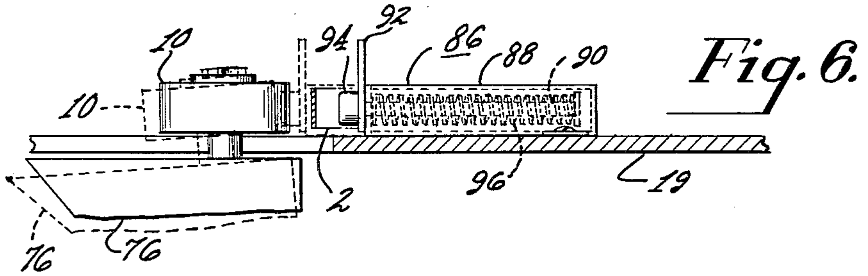
Figure 6 is a view taken along the line 6—6 of Figure 4.

Referring now to the drawings in more particularity, there is shown a tape reeling system in which a flexible tape 2 is reeled from a storage reel 4 to a take up reel 6. The tape is driven at a constant speed by a capstan 8. A pressure roller 10 is pivotally mounted adjacent to the capstan and is biased by a spring 12 to normally exert pressure on the tape to assure a good driving contact between the tape and the capstan. A plurality of guide rollers 14, 16, 18 and 20 define a path for the tape which includes one or more loops 22, 24. Two of the guide rollers 14, 16 are mounted on pivot arms or cranks 26, 28, respectively, the cranks 26 and 28 being connected, respectively, to pivot shafts 30 and 32. The two rollers 14, 16 protrude through arcuate slots 15, 17 in a top plate 19, and ride in the closed end of the respective loops.

The drive system for the take-up reel is substantially identical with that of the storage reel. The following description of one of these systems is equally applicable to the other. The take-up reel is mounted on a frictionally driven turntable 34 which is mounted substantially concentrically with a circular opening 35 in the top plate 19. The turntable consists of a disk like member 36 having a central, cylindrical bearing 38 which is closed at the upper end. The central bearing also serves as a spindle for the reel. Below the turntable is a driving disk 40 which is secured to one end of the hollow shaft 42. Secured to the other end of the hollow shaft is a driving pulley 44, which is connected by a belt 45 to a driving motor (not shown). This shaft is mounted in suitable bearings 46 supported on a mounting panel 48. Between the driving disk 40 and the turntable disk 36, there is positioned a friction pad 50 which may be made of felt or the like. A pin 52 is positioned loosely through the hollow shaft 42, extending upwardly into the cylindrical bearing 38 of the turntable. The lower end of the pin is supported on a lever member 54 which is mounted beneath the mounting panel and extends below the driving pulley 44. An adjustable stop 56 limits the downward movement of the lever member 54 to a predetermined position. The pivot arm or crank 28 is coupled through a spring 58 and a cord 60 to an arm 62 on the lever member 54.

In the normal operating position, the pin 52 rests on the lever 54 which is held by gravity in a position limited by the stop member 56. The upper end of the pin falls slightly short of the closed end of the cylindrical bearing 38. In this position, the frictional coupling between the driving disk 40, friction pad 50 and the turntable 34 is determined largely by the weight of the reel and the tape which happens to be on the reel at any particular time. If, however, the tension in the tape between the reel and the capstan increases, the loop will be shortened, causing the guide roller and its associated arm to be rotated about its pivot. The motion of the arm is transmitted through the spring and the cord, which passes over the rollers 64, 66, to the arm 62 on the lever member. This causes the lever member 54 to be moved about its pivot 68, raising the pin 52 so that the pin exerts pressure on the closed end of the cylindrical bearing 38. This reduces the frictional coupling between the driving disk 40 and the turntable 34. Since, in reeling systems of this general type, the driving disk of the turntable associated with the take up reel is over-driven in the direction tending to wind the tape onto the reel, a reduction in the frictional coupling between the driving disk and the turntable will cause the tension in the tape to be correspondingly reduced.

The driving disk associated with the supply reel is driven similarly in a direction which would tend to cause the tape to be wound onto that reel. However, the capstan pulls the tape off this reel, causing the reel, itself, to rotate in a direction opposite to that of the driving disk. These counteracting torques develop sufficient tension in the tape between this reel and the capstan to prevent looseness in the tape. If, however, the tension increases beyond a predetermined, desired amount, the loop will shorten and, in the manner just described with regard to the take up reel, will reduce the frictional coupling between the driving disk and the turntable, lessening the tension in that portion of the tape. In order to prevent an oscillatory movement of the pivot arms associated with the guide rollers, the lower end of their respective pivots 30, 32 are coupled, to respectively, dashpots 70, 72 which provide sufficient damping to prevent the aforementioned oscillatory movement. The relatively fixed end of each dashpot is also linked to its arm 62 on the associated lever member 54.

Thus, it may be seen that, if a change occurs in the length of either of the loops in the tape and the change is a relatively gradual one, the accompanying motion of the arms 26 or 28, as the case may be, is transferred to the associated lever member 54 substantially entirely through the cord 60 since the dashpot will permit a gradual motion of its piston without exerting any appreciable force on its cylinder. However, if the change in length of either of the loops is relatively sudden, the dashpot constitutes a substantially solid link between the pivoted arm and the lever member, immediately transferring the movement of the arm to the lever member, and, hence, to the clutch. There is thus provided means for varying the coupling of the clutch which, for gradual changes in the loop length, includes a desirable time delay, and which, for sudden changes in the loop length, bypasses the time delay. Stated in another way, means which are responsive to either the amplitude of the change in the loop length or to the rate of change in the loop length are provided for effecting a commensurate change in the coupling of the clutches.

Figure 5:
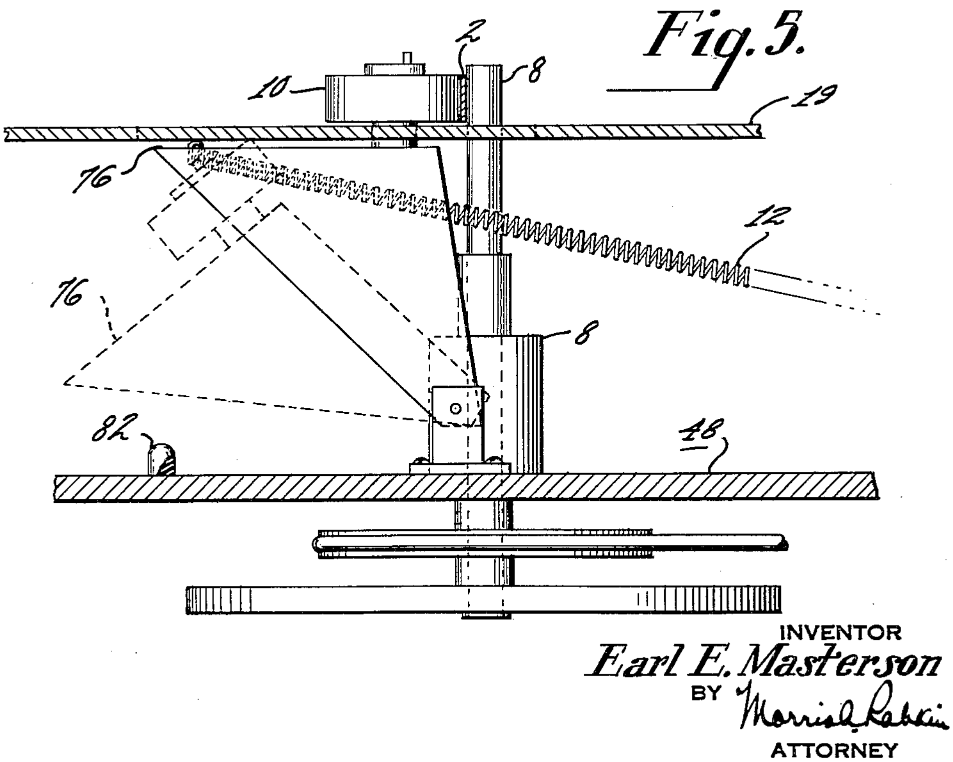
Figure 5 is a view, partly in section, taken along the line 5—5 of Figure 4 and looking in the direction of the appended arrows.

In magnetic recording apparatus, the constant speed capstan 8 is disposed in a position very near to the signal transducer 74 which is arranged to lie between the capstan and the supply or storage reel 4. In accordance with the present system, the transducer is mounted on the top plate 19. The guide roller 18, also mounted on the top plate, is positioned between the jockey idler 14 and the transducer. Another guide roller 20 is positioned between the capstan and the second jockey idler 16. The pressure roller 10, which is adapted to press the tape against the capstan, is mounted on a rocket member 76 which is pivotally secured to the mounting panel 48. Although the mounting means for the pressure roller may be arranged to pivot about an axis normal to the plane of the mounting panel 48, it is preferably arranged to pivot about an axis which is parallel to the plane of the panel. With this latter arrangement, the pressure roller 10, in its closed or operating position, extends through a somewhat elongated opening 78 in the top plate 19. When the pressure roller is moved pivotally away from the capstan 8 to its open position, it assumes a position which is below the level of the top plate, as shown in dash lines in Figure 5, thus leaving the surface of the top plate free from a projection about which a loose tape may become snagged or entangled. Such an arrangement considerably facilitates the handling of the tape during a loading or editing operation.

The spring 12 is attached, at one end, to the rocker member 76 and, at the other end, to the mounting panel. This spring is arranged as a so-called overcenter spring whereby, when the pressure roller is in its closed position, biasing force is supplied by the spring urging the pressure roller against the capstan; and when the pressure roller is in its open position, the rocker member 76 is urged, by the spring, against a rubber bumper 82 secured to the mounting panel.

There may also be mounted on the rocker member a sensing device 84 for detecting the occurrence of an actuating element on the tape. The actuating element suitably may be a piece of metal foil attached to the back of the tape to indicate the approach of the end of the tape, in which case the sensing device could be connected to control the reel drive motors. Alternatively, the actuating element may be used to indicate the beginning of a proposed portion of the tape to be edited out of the finished recording. In that case, the sensing device may be connected to control the reproducing amplifier or the like in the audio circuit. Thus, when it is desired to edit the tape, instead of cutting the tape, on the initial finding of the portion to be eliminated, a piece of foil is placed on the tape at the proposed cutting place. If then, the tape is played back, the audio output of the reproducer will be cut off electrically upon the passage of the actuating element past the sensing device, demonstrating the accuracy of the selection of the cutting place.

Figure 4:
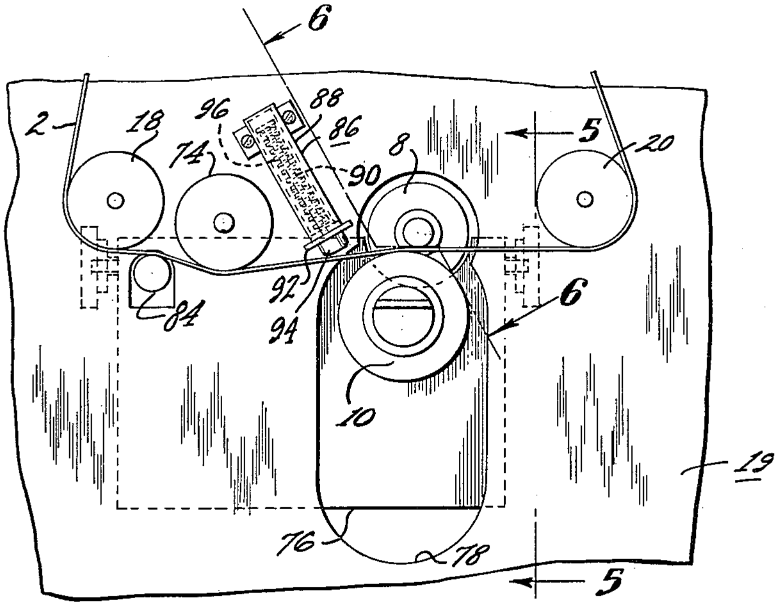
Figure 4 is an enlarged top view of the apparatus showing the constant speed portion of the tape path.

In order to adapt the reeling system to be used as an editing machine, means are provided for instantly stopping the motion of the tape. As shown in Figure 1, and more clearly in Figure 4, there is provided a brake member 86 mounted on the top plate 19 between the transducer 74 and the capstan 8. The brake member 86 consists of a housing member 88 in which is carried a plunger shaft 90. The plunger shaft terminates at its forward end in an operating handle 92 and a brake pad 94 made of rubber or the like. The plunger shaft and brake pad are normally held in a retracted position as shown by a spring 96 which is compressed between a flange or washer on the rear end of the shaft and the forward wall of the housing.

In operating the apparatus as an editing machine, the tape is pulled past the transducer by the capstan against which the tape is held by the pressure roller 10. The editor holds one of his fingers on the operating handle of the brake member. When he hears an objectionable sound, he quickly and firmly moves the operating handle of the brake member forward against the force of the spring. This movement pinches the tape between the brake pad and the pressure roller, stopping it instantly. The distance between the transducer and the point of contact of the brake on the pressure roller is sufficient to allow for the reaction time of the editor. The force applied to the operating handle by the operator's finger should be sufficiently strong to move the pressure roller out of engagement with the capstan, removing the driving force from the tape.

Any shock that may be imparted to the tape by the instantaneous stopping thereof is taken up in the previously described tension control system. The loop in the tape between the capstan 10 and the take-up reel suddenly shortens, disengaging the clutch mechanism associated with that reel, and thereby removing the driving force from that reel. The remaining shock, that due to the inertia of the reel, is taken up by the spring 58 connected to the pivot arm or crank 28. After the initial shock has passed, the tension control system is stabilized with enough tension in the tape to prevent slack. On the other side of the capstan, the loop in the tape between the capstan and the supply reel is loosened, permitting an increase in the frictional engagement of the clutch through which the supply reel is driven. Since the driving disk portion of the clutch is driven in a direction which tends to wind the tape onto the supply reel, opposite to the actual direction of rotation of the reel, the increase in the frictional coupling of the clutch increases the tendency to wind the tape onto the supply reel, increasing the tension between the supply reel and the capstan and thereby taking up the increased length of the loop. Here, again, the system stabilizes itself with sufficient tension in the tape to prevent slack.

Figure 7:
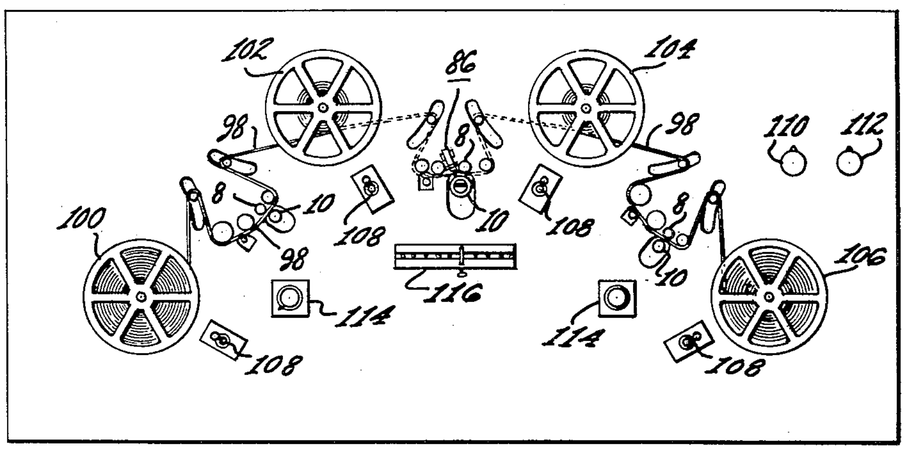
Figure 7 is a top view of one proposed form of apparatus embodying the present invention and particularly suitable for use in a recording studio.

In Figure 7, there is shown a machine constructed in accordance with the present invention and particularly suited to be used as a rerecording, tape editing machine. In this arrangement, there are three complete reeling systems that are operable separately or in cooperation with each other. When using the apparatus as a rerecorder, the record tape 98 may be driven from the first reel 100 to the second reel 102, or from the third reel 104 to the fourth reel 106. In the event that the recorded selection is longer than could be carried conveniently by one reel of tape, as in some classical selections, the first portion of the selection could be driven from the first to the second reel while the second portion of the selection is made ready for reeling from the third to the fourth reel. In this latter instance, an automatic cutover may be provided whereby the second portion of the selection may be started without interrupting the continuity of selection. The sensing devices in cooperation with actuating elements on the tape, earlier described, may be used for this purpose.

When the apparatus is used for editing recorded selections, the tape is driven between the second and third reels. A second recording of the same selection may be stored on the first reel. Now, let it be assumed that a portion of the recording on the second reel is found to be not up to standard, and that the corresponding portion on the first reel is satisfactory. In such case, the objectionable portion may be removed from the one reel and the acceptable portion from the other reel spliced in. The fourth reel may be used to store the rejected material from the two supply reels.

In order to permit such use of the machine, each reel motor is provided with its own "On-Off" switch 108. In addition, the motors which drive the second and third reels must be of a reversible type. Their direction of rotation would be determined by setting of an "Edit-Phono" switch 110. Adjacent to the "Edit-Phono" switch, there is also shown a main power switch 112.

Suitable volume control means 114 are provided whereby the operator of the machine may control the amplitude of the reproduced signal. A splicing head 116 is also mounted on the top plate 19 in a position convenient to the middle reeling system.

It should now be apparent that there has been provided, in accordance with the present invention, an improved tape reeling system which is suitable for use as a rerecording and editing machine.

What is claimed is:

A reeling system for tape reeling apparatus of the type wherein a flexible tape is adapted to be moved from a storage reel to a take-up reel, said system comprising means including a variable-friction clutch for driving the storage reel, cconstant speed driving means for driving said tape, means responsive to variations in the tension of the tape between said constant speed means and said storage reel for varying the frictional engagement of said clutch whereby the tension in said tape between said constant speed driving means and said storage reel is maintained substantially constant, means including a second variable-friction clutch for driving the take-up reel, and means responsive to variations in the tension of said tape between said constant speed driving means and said take-up reel for varying the frictional engagement of said second clutch whereby the tension in said tape between said constant speed means and said take-up reel is maintained substantially constant, said means for varying the frictional engagement of each of said clutches including means operable as a function of the amplitude of the change in tension of said tape, and further means operable as a function of the rate of change in the tension of said tape, said last two means being mechanically connected in shunt with respect to each other.

References Cited in the file of this patent

UNITED STATES PATENTS

| | | |
|---|---|---|
| 1,216,084 | Dahlberg | Feb. 13, 1917 |
| 1,539,408 | Pigeon | May 26, 1925 |
| 1,629,029 | Garbutt | May 17, 1927 |
| 1,654,800 | Garbutt | Jan. 3, 1928 |
| 1,992,706 | Lira | Feb. 26, 1935 |
| 2,343,181 | Heinz | Feb. 29, 1944 |
| 2,351,591 | Balk | June 20, 1944 |
| 2,401,982 | Springhorn | June 11, 1946 |
| 2,462,558 | Schevermann et al. | Feb. 22, 1949 |
| 2,518,417 | Carrier | Aug. 8, 1950 |
| 2,568,431 | Congdon | Sept. 18, 1951 |

FOREIGN PATENTS

| | | |
|---|---|---|
| 626,721 | Great Britain | July 20, 1949 |